May 7, 1968  G. D. BALDWIN ET AL  3,382,404
LOW VOLTAGE CONVERTER FOR PROTECTIVE FILAMENT HEATING SYSTEM

Filed Nov. 10, 1964  2 Sheets-Sheet 1

George D. Baldwin
Joseph Spiteri
INVENTORS

BY *Clarence A. O'Brien*
and *Harvey B. Jacobson*
Attorneys

George D. Baldwin
Joseph Spiteri
INVENTORS

United States Patent Office 3,382,404
Patented May 7, 1968

3,382,404
LOW VOLTAGE CONVERTER FOR PROTECTIVE FILAMENT HEATING SYSTEM
George D. Baldwin, Jamestown, N.Y., and Joseph Spiteri, Erie, Pa., assignors to Truck-Lite Co., Inc., Jamestown, N.Y., a corporation of New York
Filed Nov. 10, 1964, Ser. No. 410,098
2 Claims. (Cl. 315—77)

ABSTRACT OF THE DISCLOSURE

A converter unit installed within a vehicle and connected to the ignition and lighting circuits to continuously supply an undervoltage to the vehicle lamp filaments when the lamp switch is opened and the ignition switch is closed. The undervoltage applied is regulated to maintain the lamp filaments in a pliable state at a threshold temperature above which incandescence occurs in order to prevent cold shock when full voltage is applied upon closing of the lamp switch.

---

This invention relates to lighting systems of vehicles and more particularly to a device for protecting vehicle lamp filaments against cold shock found to be a major cause of filament failure.

It is therefore a primary object of the present invention to provide a relatively simple and inexpensive attachment for vehicles whereby the life of the lamp filaments in the vehicle lighting system, may be prolonged.

In accordance with the foregoing object, the device of the present invention is operative to maintain an undervoltage across the lamp filaments during vehicle operation when the lighting system is not in use. The undervoltage applied to the lamp filaments is operative to maintain the filaments at an elevated temperature below incandescence whereby the filaments are in a soft or pliable state. Accordingly, when the vehicle light switch is turned on, the sudden supply of full voltage to the lamp filaments will not produce the abrupt increase in filament temperature that has heretofore caused filament rupture particularly when the ambient temperature is extremely low.

Although the supply of an undervoltage to lamp filaments has heretofore been proposed in Patent No. 2,407,-113 to Tuck, in order to prolong filament life, this method of prolonging filament life has not been adopted for vehicle lighting systems because of various problems involved in converting the full voltage to the proper undervoltage when the vehicle lamps are not in use. For example, the use of ordinary resistors for voltage reducing purposes could not accommodate different lamp loads or any large change in lamp load that must be handled in vehicle installations. A large reduction in lamp load would therefore short circuit and prevent relay operation and the supply of full voltage when desired in the case of the prior art arrangement. Also, no facilities were provided for disabling operation of the voltage reducing device upon opening of the vehicle ignition switch. It is, therefore, an additional object of the present invention to provide a low voltage converter which copes with the aforementioned problems in a reliable manner and without involving any bulky and expensive equipment.

It is therefore a still further object of the present invention to provide a low voltage converter for supplying an undervoltage during vehicle operation to the vehicle lamp filaments when not in use, utilizing a variable resistor or thermistor having a negative temperature coefficient of resistance. In this manner, a relatively constant volt drop is maintained across the battery load both during the supply of full voltage and undervoltage to the lamp filaments in order to avoid short circuiting of the relay component rendered operative during operation of the vehicle to introduce the thermistor into the circuit of the lighting system.

Yet another object of the present invention is to provide a low voltage converter for supply of an undervoltage to the lamp filaments of a vehicle lighting system, the converter being operative to supply the proper undervoltage regardless of the number of vehicle lamp filaments involved or the amount of current drawn through the lamp circuit, the converter being operative in a self regulating loop in order to supply the proper undervoltage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
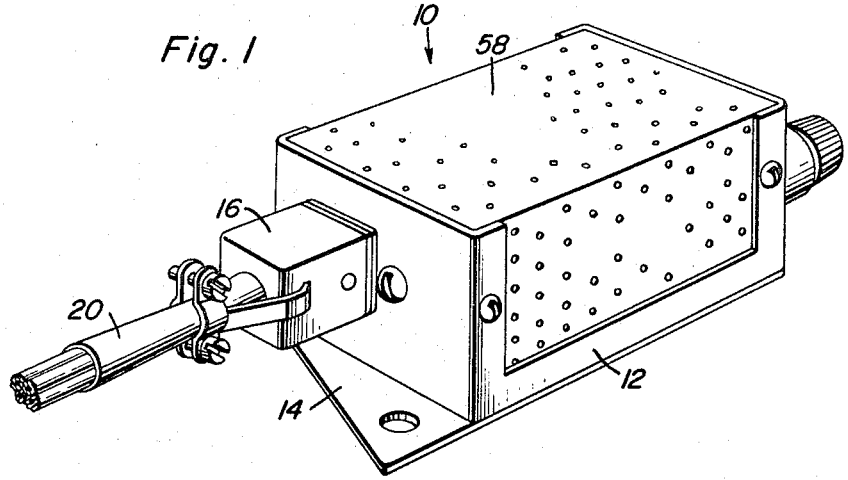
FIGURE 1 is a perspective view of the low voltage converter.
Figure 2:
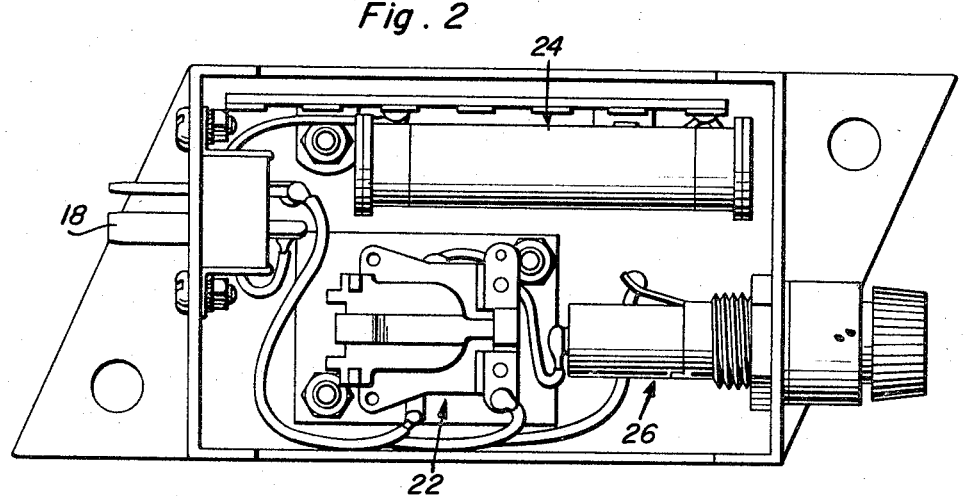
FIGURE 2 is a top plan view of the converter with its cover removed.

Referring now to FIGURES 1 and 2, it will be observed that the converter generally referred to by reference numeral 10 is enclosed by a housing 12. Mounting flanges 14 extend from opposite longitudinal ends of the housing so that the converter may be mounted at any suitable location in the vehicle. An electrical connector 16 is plugged into one end of the housing for receiving four prongs 18 projecting therefrom whereby the electrical conduit 20 establishes the electrical connections to the components of the converter. These components, as more clearly seen in FIGURE 2, include an electro-mechanical relay device 22, a thermistor 24 and a replaceable fuse device 26.

Figure 3:
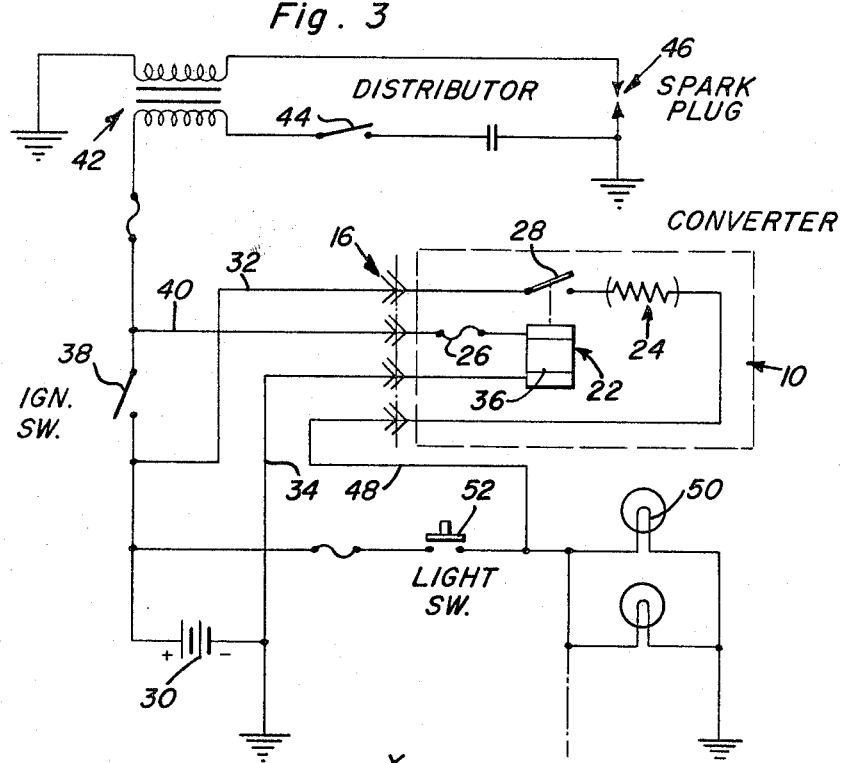
FIGURE 3 is an electrical circuit diagram illustrating the system of the present invention.

Referring now to FIGURE 3, it will be observed that the electrical connector 16 establishes an electrical connection from the relay switch 28 of the relay to the positive terminal of a constant source of voltage such as a 12 volt vehicle battery 30 by means of the conductor 32. The grounded, negative terminal of the battery is connected by conductor 34 and the electrical connector 16 to one terminal of the relay coil 36 within the converter, the other terminal of the relay coil being electrically connected by the fuse device 26 and the electrical connector 16 to the ignition switch 38 by means of conductor 40. It will therefore be apparent, that the relay coil 36 is energized only upon closing of the ignition switch to establish a connection to the positive terminal of the vehicle battery 30. Closing of the ignition switch is also operative, of course, to energize the induction coil 42 of the vehicle ignition system including the distributor contacts 44 and spark plugs 46. A conductor 48 also extends from the connector 16 to the parallel connected lamp filaments 50 bypassing the connection established between the lamp filaments and the positive terminal of the vehicle battery 30 upon closing of the light controlling switch 52. The conductor 48 is therefore electrically connected through the connector 16 to one side of the thermistor device 24, the other side thereof being connected to the positive terminal of the battery 30 upon closing of the relay switch 28.

Figure 5:
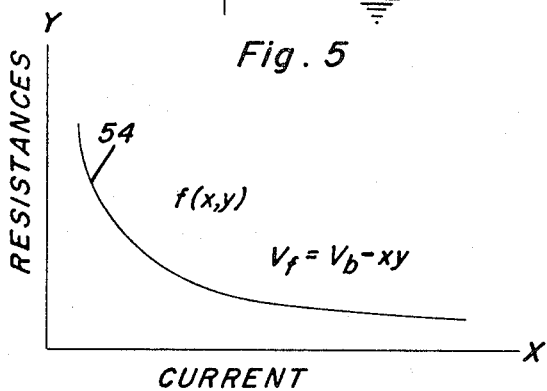
FIGURE 5 is a graphical illustration of the volt drop relationship associated with the low voltage converter.
Figure 4:
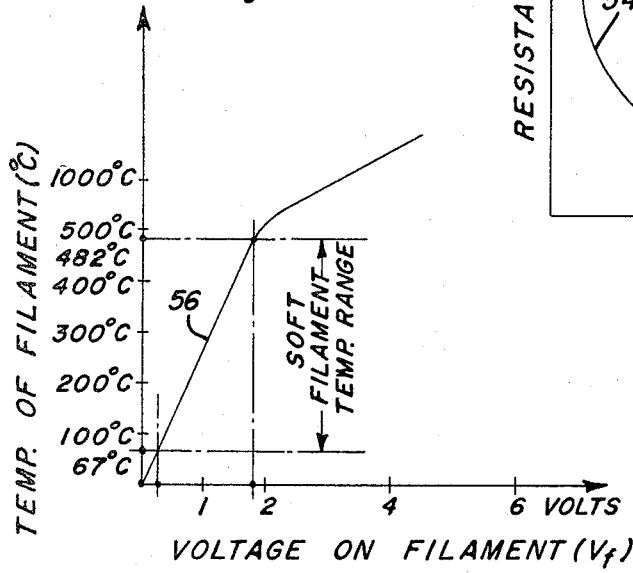
FIGURE 4 is a graphical illustration of the lamp filament voltages and temperatures effected by the present invention.

The thermistor 24 is a variable resistor having a high cold resistance at room temperature of 25° centigrade, the resistance dropping to 6 to 8 ohms approximately after 15 to 20 minutes when voltage is applied thereacross. As shown in FIGURE 5, the thermistor has a negative temperature coefficient of resistance depicted by the curve 54 which is a function of the variable resistance (Y) of the thermistor and the current (X) passing therethrough. Accordingly, the volt drop across the thermistor will be equal to the product of the resistance and current (XY) in order to continuously supply an undervoltage ($V_F$) to the lamp filaments which is equal to the terminal voltage of the battery ($V_B$) less the volt drop of the thermistor when it is connected to the positive terminal of the battery upon closing of the relay switch 28 as indicated by the expression $V_F = V_B - XY$ in FIGURE 5. Short circuiting of the relay coil 36 is avoided in order to maintain the relay energized during operation of the vehicle when the ignition switch 38 is closed. The relay coil 36 is therefore connected by conductor 40 on that side of the ignition switch opposite the positive terminal of the battery whereas the relay switch 28 is connected by conductor 32 directly to the positive terminal of the battery. A thermistor 24 is selected with such a characteristic as to produce an undervoltage having a nominal value of 1 volt where a 12 volt vehicle battery is utilized and the vehicle lamp circuit has a resistance between one-quarter and one-half ohms approximately. Depending upon the number of lamps and current drawn therethrough, the undervoltage value may vary, but because of the characteristic of the thermistor, this undervoltage will be within a range of 0.25 and 1.8 volts as depicted in FIGURE 4. This undervoltage range corresponds to a portion on the temperature vs. voltage curve 56 for the lamp filaments which lies within a temperature range of 67° C. to 482° C. Within this temperature range, the lamp filaments are in a soft and pliable state. At a threshold temperature of 268° C. for this filament, no light is visible. At 482° C. there is an almost imperceptible glow. However, because of manufacturing tolerances, only a few filaments will have any glow when being warmed by undervoltage near the upper limit. Accordingly, the undervoltage is not effective in most cases to produce any degree of incandescence.

From the foregoing description, the operation of the filament protective system will be obvious. When the vehicle is set into operation by closing of the ignition switch 38, the relay 22 is energized so as to close the relay switch 28. The thermistor 24 is then immediately operative to supply an undervoltage to the lamp filaments 50 in order to maintain them at an elevated temperature within the indicated range not sufficient to produce incandescence yet operative to prevent cold shock when full voltage is subsequently applied to the lamp filaments upon closing of the light switch 52. In view of the resistance varying characteristic of the thermistor 24, upon closing of the light switch 52 the load on the battery previously applied because of the volt drop across the thermistor, remains substantially the same in view of the increase in filament resistance of the lamps so that the relay 22 is not shorted and remains energized. Also, by use of the relay 22, high current flow to the lamp filaments through the ignition switch is avoided, the relay coil itself drawing a current in the neighborhood of .008 ampere. It will also be apparent, that closing of the relay switch 28 produces a closed, self regulating loop within which the thermistor 24 is located so as to supply the aforementioned nominal 1 volt undervoltage to the lamp circuit regardless of the number of the lamps or amount of current drawn therethrough. It will be further apparent, that the system of the present invention may be readily installed in the vehicle by the indicated connections to the converter unit 10, the housing 12 of which may be closed by a protective cover 58 which is perforated as shown in FIGURE 1 in order to avoid excessive accumulation of heat therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a vehicle having a constant source of voltage connected in parallel to an ignition switch for operating the vehicle and a light switch for supplying full voltage to a plurality of lamp filaments, a low voltage converter comprising, relay means connected to said source of voltage independently of the light switch for energization in response to closing of the ignition switch, a variable resistor having a negative temperature coefficient connected in series with said lamp filaments, and means responsive to energization of the relay means for connecting the resistor to the source of voltage to supply an undervoltage to the lamp filaments when the light switch is opened.

2. The combination of claim 1 wherein said resistor is operative to supply said undervoltage within a voltage range of 0.25 to 1.8 volts.

References Cited

UNITED STATES PATENTS

| | | | |
|---|---|---|---|
| 2,110,690 | 3/1938 | Zierahn | 315—71 X |
| 2,407,113 | 9/1946 | Tuck | 315—291 |
| 2,646,489 | 7/1953 | McArron | 315—311 X |
| 3,112,435 | 11/1963 | Barney | 323—68 X |

JAMES W. LAWRENCE, *Primary Examiner.*

P. C. DEMEO, *Assistant Examiner.*